(12) United States Patent
Song et al.

(10) Patent No.: US 11,299,978 B2
(45) Date of Patent: Apr. 12, 2022

(54) MULTI-LAYER DISTANCE TO BED BOUNDARY (DTBB) INVERSION WITH MULTIPLE INITIAL GUESSES

(71) Applicant: Halliburton Energy Services, Inc., Houston, TX (US)

(72) Inventors: Rencheng Song, Singapore (SG); Li Pan, Singapore (SG); Hsu-Hsiang Wu, Sugar Land, TX (US)

(73) Assignee: Halliburton Energy Services, Inc., Houston, TX (US)

( * ) Notice: Subject to any disclaimer, the term of this patent is extended or adjusted under 35 U.S.C. 154(b) by 225 days.

(21) Appl. No.: 16/465,288

(22) PCT Filed: Feb. 6, 2017

(86) PCT No.: PCT/US2017/016672
§ 371 (c)(1),
(2) Date: May 30, 2019

(87) PCT Pub. No.: WO2018/144029
PCT Pub. Date: Aug. 9, 2018

(65) Prior Publication Data
US 2019/0390542 A1 Dec. 26, 2019

(51) Int. Cl.
*E21B 47/022* (2012.01)
*G01V 3/18* (2006.01)
(Continued)

(52) U.S. Cl.
CPC ............. *E21B 47/022* (2013.01); *G01V 3/18* (2013.01); *G01V 3/38* (2013.01); *G01V 99/005* (2013.01);
(Continued)

(58) Field of Classification Search
CPC .......... E21B 47/022; E21B 7/04; E21B 41/00; E21B 44/00; G01V 3/18; G01V 3/38;
(Continued)

(56) References Cited

U.S. PATENT DOCUMENTS

| 8,680,865 B2 * | 3/2014 | Zhang | G01B 3/30 |
| | | | 324/338 |
| 9,310,511 B2 * | 4/2016 | Itskovich | G01V 3/38 |

(Continued)

FOREIGN PATENT DOCUMENTS

| WO | WO 2010/039757 A1 | 4/2010 |
| WO | WO 2014/098919 A1 | 6/2014 |
| WO | WO 2017/135960 A1 | 8/2017 |

OTHER PUBLICATIONS

International Search Report and the Written Opinion of the International Search Authority, or the Declaration, dated Oct. 17, 2017, PCT/US2017/016672, 16 pages, ISA/KR.

*Primary Examiner* — Daniel R Miller
*Assistant Examiner* — Christian T Bryant
(74) *Attorney, Agent, or Firm* — Haynes and Boone, LLP

(57) ABSTRACT

System and methods for geosteering inversion are provided. A downhole tool's response along a path of a wellbore to be drilled through a formation is predicted over different stages of a downhole operation, based on each of a plurality of initial models of the formation. Each initial model represents a different number of formation layers over a specified range. The tool's actual response with respect to one or more formation parameters is determined, based on measurements obtained during a current stage of the operation. The actual response is compared with that predicted from each of the initial models. At least one of the models is selected as an inversion model, based on the comparison and a selection criterion. Inversion is performed for subsequent stages of the operation along the wellbore path, based on the selected (Continued)

model. The wellbore path is adjusted for the subsequent stages, based on the inversion results.

20 Claims, 7 Drawing Sheets

(51) Int. Cl.
| | |
|---|---|
| G01V 3/38 | (2006.01) |
| G01V 99/00 | (2009.01) |
| E21B 7/04 | (2006.01) |
| G05B 13/02 | (2006.01) |
| G06F 11/00 | (2006.01) |
| G05B 11/01 | (2006.01) |
| E21B 41/00 | (2006.01) |
| E21B 44/00 | (2006.01) |
| G06N 5/00 | (2006.01) |
| G05B 15/02 | (2006.01) |

(52) U.S. Cl.
CPC ............. *E21B 7/04* (2013.01); *E21B 41/00* (2013.01); *E21B 44/00* (2013.01); *G05B 11/01* (2013.01); *G05B 13/02* (2013.01); *G05B 15/02* (2013.01); *G06F 11/00* (2013.01); *G06N 5/00* (2013.01)

(58) Field of Classification Search
CPC ....... G01V 99/005; G06F 11/00; G05B 11/01; G05B 13/02; G05B 15/02; G06N 5/00
See application file for complete search history.

(56) References Cited

U.S. PATENT DOCUMENTS

| | | | |
|---|---|---|---|
| 2004/0154831 A1 | 8/2004 | Seydoux et al. | |
| 2005/0140373 A1* | 6/2005 | Li | G01V 3/30 324/338 |
| 2009/0237084 A1* | 9/2009 | Itskovich | G01V 3/28 324/339 |
| 2010/0262370 A1* | 10/2010 | Bittar | G01V 11/002 702/6 |
| 2011/0191029 A1 | 8/2011 | Jalali et al. | |
| 2012/0080197 A1 | 4/2012 | Dickens et al. | |
| 2014/0149040 A1 | 5/2014 | Omeragic et al. | |

* cited by examiner

MULTI-LAYER DISTANCE TO BED BOUNDARY (DTBB) INVERSION WITH MULTIPLE INITIAL GUESSES

CROSS-REFERENCE TO RELATED APPLICATIONS

The present application is a U.S. National Stage patent application of International Patent Application No. PCT/US2017/016672, filed on Feb. 6, 2017, the benefit of which is claimed and the disclosure of which is incorporated herein by reference in its entirety.

FIELD OF THE DISCLOSURE

The present disclosure relates generally to hydrocarbon exploration and production, and particularly, to geosteering inversion for directional drilling of wellbores during downhole operations for hydrocarbon exploration and production.

BACKGROUND

In the field of hydrocarbon exploration and production, downhole logging tools are typically used to provide an indication of the properties of rock formations surrounding a wellbore as it is drilled through the formations. An example of such a downhole logging tool is an electromagnetic resistivity logging while drilling (LWD) tool. Such a LWD tool typically includes at least one transmitting antenna and multiple receiving antennas located at different distances from the transmitting antenna along the axis of the tool. The transmitting antenna is used to generate electromagnetic fields in the surrounding formation. In turn, the electromagnetic fields in the formation induce a voltage in each receiving antenna. The response of the formation is converted into a set of inversion parameters, which are then used to estimate various properties of the formation. Such information is useful in ascertaining the presence or absence of fluids, such as hydrocarbons.

Inversion can be performed on a point-by-point basis during downhole logging operations. To deal with formation heterogeneity, such as shoulder effects from formation layer boundaries, a "one-dimensional" (1D) inversion may be performed to determine an appropriate layered formation model that matches the measurements acquired by the downhole tool from at least a single point. Accordingly, a 1D inversion based on such a formation model may be used to perform a "distance to bed boundary" (DTBB) analysis for mapping boundaries between different formation layers.

However, conventional DTBB inversion techniques generally require an initial formation model with particular assumptions about the underlying formation. However, incorrect assumptions may lead to a formation model that is not an accurate representation of the actual formation. Such a model may be ill-conditioned for inversion, due to its tendency to produce inversion results that trap into a local minimum. This tendency becomes worse as the number of formation layers in the inversion increases. For example, the number of formation layers may be quite large when the inversion is performed using deep measurements collected by a downhole logging tool over an extended range within the formation.

As the number of formation layers is usually an unknown variable in the inversion, conventional inversion techniques use a deterministic approach to perform inversion based on a pre-selected layer number. The pre-selected layer number is typically based on a priori information, e.g., a pre-existing wellbore model, and stays constant as the inversion is performed over the course of a downhole operation. However, the selected layer number may deviate substantially from the actual number of layers for which inversion needs to be performed during the downhole operation. As a result, additional uncertainty may be introduced into the inversion process. While gradient-free inversion techniques, e.g., stochastic inversion, may be used to optimize the layer number as a variable, the efficiency of gradient-free inversion is usually much lower than deterministic inversion due to the lengthy simulation times and/or additional computing resources that are required for such gradient-free techniques to produce acceptable inversion results.

DESCRIPTION OF ILLUSTRATIVE EMBODIMENTS

Figure 1A:
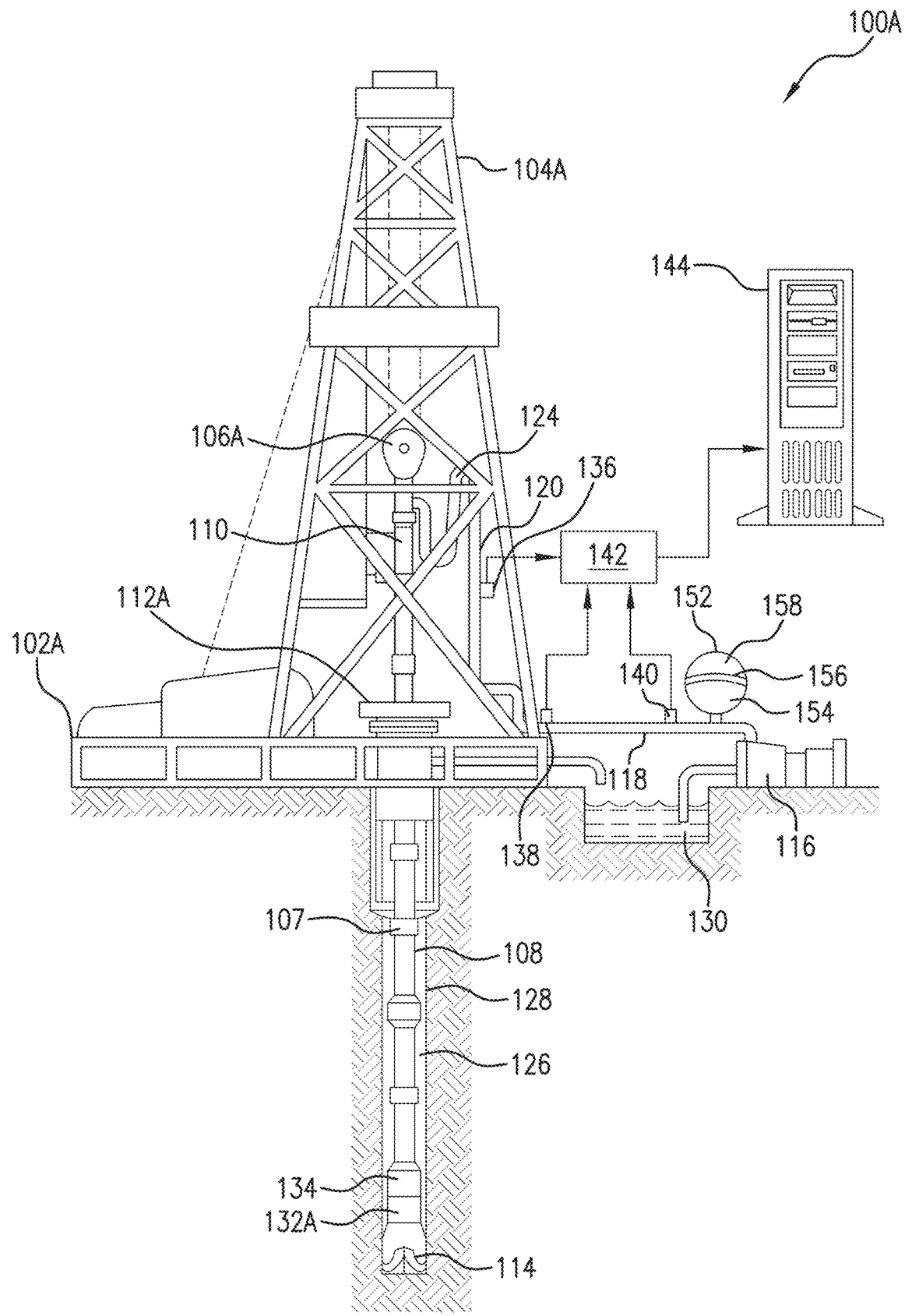
FIG. 1A is a diagram of an illustrative drilling system including a logging tool for performing a downhole operation at a well site.

Embodiments of the present disclosure relate to multi-layer distance to bed boundary (DTBB) inversion with multiple initial guesses for well planning and control based on. While the present disclosure is described herein with reference to illustrative embodiments for particular applications, it should be understood that embodiments are not limited thereto. Other embodiments are possible, and modifications can be made to the embodiments within the spirit and scope of the teachings herein and additional fields in which the embodiments would be of significant utility. Further, when a particular feature, structure, or characteristic is described in connection with an embodiment, it is submitted that it is within the knowledge of one skilled in the relevant art to implement such feature, structure, or characteristic in connection with other embodiments whether or not explicitly described.

It would also be apparent to one of skill in the relevant art that the embodiments, as described herein, can be implemented in many different embodiments of software, hardware, firmware, and/or the entities illustrated in the figures. Any actual software code with the specialized control of hardware to implement embodiments is not limiting of the detailed description. Thus, the operational behavior of embodiments will be described with the understanding that modifications and variations of the embodiments are possible, given the level of detail presented herein.

In the detailed description herein, references to "one embodiment," "an embodiment," "an example embodiment," etc., indicate that the embodiment described may include a particular feature, structure, or characteristic, but every embodiment may not necessarily include the particular feature, structure, or characteristic. Moreover, such phrases are not necessarily referring to the same embodiment.

The term "ahead" may be used herein to refer to the downstream or downhole direction (e.g., ahead of the toe of the wellbore) with respect to a particular component of a drill string or current layer of a subsurface formation in which the drill string component is located relative to other layers of the formation. Unless otherwise stated, this term and other spatially relative terms that may be used in this disclosure are intended to encompass different orientations of the apparatus in use or operation in addition to the orientation depicted in the figures. For example, an apparatus shown in the figures may be otherwise oriented (rotated 90 degrees or at other orientations) and the spatially relative descriptors used herein may be interpreted accordingly. Thus, if an apparatus in the figures is rotated 180 degrees, elements described as being "below" or "beneath" other elements or features would then be oriented "above" the other elements or features.

Further, even though a figure may depict a vertical wellbore, unless indicated otherwise, it should be understood by one of ordinary skill in the art that the apparatus according to the present disclosure is equally well suited for use in wellbores having other orientations including horizontal wellbores, deviated or slanted wellbores, multilateral wellbores or the like. Likewise, unless otherwise noted, even though a figure may depict an onshore operation, it should be understood by those skilled in the art that the apparatus according to the present disclosure is equally well suited for use in offshore operations and vice-versa. Further, unless otherwise noted, even though a figure may depict a cased hole, it should be understood by one of ordinary skill in the art that the apparatus according to the present disclosure is equally well suited for use in open hole operations.

As will be described in further detail below, embodiments of the present disclosure may be used as part of a geosteering service for performing different stages of a downhole operation within a subsurface reservoir formation. Such an operation may be, for example, a drilling operation involving drilling a wellbore along a planned path toward a target zone of hydrocarbon deposits within the formation. The different stages of the drilling operation may correspond to a plurality of operating intervals in which the wellbore is drilled along the planned path through multiple layers of the formation. Each operating interval may be, for example, a different range of depth or time over which a portion of the wellbore is drilled along the planned path.

In one or more embodiments, a downhole tool disposed within the wellbore may be used to measure properties of the surrounding formation as the wellbore is drilled along its planned path. Such measurements may be collected by the downhole tool at one or more of a plurality of logging points along the path of the wellbore as it is drilled over different stages of the downhole operation. The downhole tool in this example may be a resistivity logging-while-drilling (LWD) tool for measuring the formation's resistivity at each logging point along the wellbore's path. However, it should be noted that embodiments are not intended to be limited thereto and that the disclosed embodiments may be applied to other types of downhole tools, e.g., acoustic or ultrasonic tools.

Further, it should be noted that such tools may be used to measure other types of formation properties, e.g., permeability, permittivity, etc.

In one or more embodiments, a plurality of initial models of the formation may be used to predict the tool's response for different numbers of formation layers along the wellbore's path. Each of the initial models may be, for example, a multi-layer formation model representing a different number of formation layers over a specified range. The specified range may span from one (for a homogenous formation) to any number of formation layers, e.g., within a specified depth range. Further, each model may be generated by randomly sampling different sets of formation parameters for the respective formation layer(s) represented by that model. The sampled sets of formation parameters may be based on, for example, a predefined range of parameters within some probability distribution. Such sampling may be performed such that the generated models cover all possible formation parameters. It should be appreciated that any of various well-known statistical techniques may be used as desired for a particular implementation. Accordingly, the generated inversion models may represent multiple initial guesses of formation properties for different numbers of formation layers of the formation. These initial guesses or models are then qualified or disqualified for performing DTBB inversion for multiple formation layers along the path of the wellbore during the downhole operation.

As will be described in further detail below, the qualification of the initial models for such multi-layer DTBB inversion may first involve comparing a predicted response of the downhole tool based on each initial model with the tool's actual response based on measurements collected by the tool at one or more logging points along the planned wellbore path. The results of the comparison may then be used to select as inversion models only those initial models that produce a predicted response that matches or fits the actual response within a given error tolerance. Conversely, any initial models having a misfit at or above a certain misfit threshold may be disqualified and removed from the set of models selected for performing inversion. In addition to the misfit threshold, other selection criteria may be used to qualify the set of initial models that are selected as inversion models for performing DTBB inversion during the downhole operation. Such other selection criteria may include, for example, one or more quality factors that provide an indication of the quality of each model. Examples of such quality factors may include, but are not limited to, model parameter importance and model confidence intervals for different parameters of interest. The quality factors may help to assess the quality of the DTBB inversion results produced by a particular model, leading to improved formation evaluation and operational performance, e.g., improved geosteering.

As only qualified models are selected for performing the DTBB inversion during the operation, the disclosed techniques may enable global convergence of the overall inversion results across the selected inversion models to be achieved more efficiently relative to using conventional DTBB inversion techniques. To further improve efficiency, the models and predicted responses may be generated in advance. For example, the models and associated predicted responses may be stored in a database and retrieved during each stage of the downhole operation for purposes of comparison with the tool's actual response and qualification or selection of the models to be used for performing inversion during subsequent stages of the operation. The selected models may be further refined with the inversion performed at each stage of the operation so as to better approximate the formation properties for additional layers of the formation. I Illustrative embodiments and related methodologies of the present disclosure are described below in reference to FIGS. 1A-6 as they might be employed in, for example, a computer system or surface control unit of a drilling rig at a well site for automated well planning and control. As will be described in further detail below, such a well planning and control system may be used to perform the disclosed multi-layer DTBB inversion techniques for geosteering a wellbore through different layers of a formation. Other features and advantages of the disclosed embodiments will be or will become apparent to one of ordinary skill in the art upon examination of the following figures and detailed description. It is intended that all such additional features and advantages be included within the scope of the disclosed embodiments. Further, the illustrated figures are only exemplary and are not intended to assert or imply any limitation with regard to the environment, architecture, design, or process in which different embodiments may be implemented.

FIG. 1A is a diagram of an illustrative drilling system 100A including a logging tool for performing a downhole operation at a well site. As shown in FIG. 1A, system 100A includes a drilling platform 102 located at the surface of a borehole or wellbore 126. Wellbore 126 is drilled into different layers of a subsurface rock formation using a drill string 108 that includes a string of drill pipes connected together by "tool" joints 107. Drilling platform 102A is equipped with a derrick 104A that supports a hoist 106A. Hoist 106A suspends a top drive 110 that is used to lower drill string 108 through a wellhead 112A and rotate drill string 108 within wellbore 126. Connected to the lower portion or distal end of drill string 108 is a bottom hole assembly (BHA), which includes a drill bit 114, at least one downhole tool 132A, and a telemetry device 134. It should be appreciated that drill bit 114, downhole tool 132A, and telemetry device 134 may be implemented as separate components within a housing of the BHA at the end of drill string 108. Although not shown in FIG. 1A, it should also be appreciated that the BHA may include additional components for supporting various functions related to the drilling operations being conducted. Examples of such components include, but are not limited to, drill collars, stabilizers, reamers, and hole-openers.

Drilling of wellbore 126 occurs as drill bit 114 penetrates the subsurface formation while rotating at the end of drill string 108. Drill bit 114 may be rotated in conjunction with the rotation of drill string 108 by top drive 110. Additionally or alternatively, drill bit 114 may be rotated independently from the rest of drill string 108 by a downhole motor (not shown) positioned near drill bit 114. Although wellbore 126 is shown in FIG. 1A as a vertical wellbore, it should be appreciated that wellbore 126 may be drilled in a non-vertical, horizontal, or near-horizontal direction, e.g., as a deviated well drilled at angles approaching or at 90 degrees from vertical.

Drilling fluid may be pumped at high pressures and volumes by a mud pump 116 through a flow line 118, a stand pipe 120, a goose neck 124, top drive 110, and drill string 108 to emerge through nozzles or jets in drill bit 114. The drilling fluid emerging from drill bit 114 travels back up wellbore 126 via a channel or annulus formed between the exterior of drill string 108 and a wellbore wall 128. The drilling fluid then goes through a blowout preventer (not specifically shown) and into a mud pit 130 at the surface, where the fluid is cleaned and recirculated by mud pump 116 through drill string 108 and wellbore 126. The drilling fluid may be used for various purposes during the drilling operation including, but not limited to, cooling drill bit 114, carrying cuttings from the base of the bore to the surface, and balancing the hydrostatic pressure in the rock formations.

Downhole tool 132A may be used to collect information related to downhole drilling conditions and surrounding formation properties as wellbore 126 is drilled over different stages of the drilling operation. Downhole tool 132A may be, for example, a logging-while-drilling (LWD) or a measurement-while-drilling (MWD) tool for measuring such downhole conditions and formation properties. In one or more embodiments, the measurements may be collected or logged by downhole tool 132A at one or more logging points corresponding to each stage of the drilling operation along a portion of the planned well path. For example, the measurements collected at each logging point may be accumulated over the course of the drilling operation. The accumulated logs may be stored, for example, in a local memory or storage device coupled to downhole tool 132A. Additionally or alternatively, the downhole measurements may be transferred from downhole tool 132A via a wired connection or other communication pathway to a computer 144 located at the surface, as will be described in further detail below. In one or more embodiments, the DTBB inversion techniques disclosed herein may be performed by computer 144 at the surface based on the measurements it receives from downhole tool 132A. In some implementations, downhole tool 132A may include an integrated processing system and control unit for performing at least a portion of the disclosed DTBB inversion techniques for purposes of automated geosteering of wellbore 126 along a planned or adjusted path through the formation, based on real-time measurements acquired by sensors of downhole tool 132A. Additionally or alternatively, the geosteering processing and control may be shared between the above-described automated downhole control unit of downhole tool 132A and computer 144 at the surface.

The downhole conditions measured by downhole tool 132A as wellbore 126 is drilled within the formation may include, for example and without limitation, the movement, location, and orientation of the BHA or drilling assembly. Examples of formation properties that may be measured include, but are not limited to, formation resistivity, anisotropy ratio, DTBB and dip angle of one or more formation layers. In one or more embodiments, downhole tool 132A may be an electromagnetic resistivity LWD tool integrated within a logging section of the BHA. In some implementations, downhole tool 132A may be in the form of a drill collar located immediately before drill bit 114 at a distal end of the BHA. Downhole tool 132A in this example may have an antenna structure including a tilted transmitter coil and two or more tilted receiver coils. The transmitter coil may be configured to transmit look-ahead and/or look-around signals that propagate through different areas of the surrounding rock formation. The receiver coils may be configured to receive the transmitted signal(s). It should be appreciated that the transmitter and receiver coils may be positioned in any of various orientations and tilt angles as desired for a particular implementation. In one or more embodiments, downhole tool 132A may have a designated reference point or location relative to which the tool's current position within wellbore 126 and formation may be measured during the downhole operation. Such a tool reference point may correspond to, for example, the location of drill bit 114 at the distal end of the BHA. While only downhole tool 132A is shown in FIG. 1A, it should be appreciated that the disclosed embodiments are not limited thereto and that additional downhole tools may be used.

In one or more embodiments, the information collected by downhole tool 132A may be transmitted to the surface via telemetry device 134. Telemetry device 134 may be part of a communication subsystem of drill string 108. Telemetry device 134 may be communicatively coupled to downhole tool 132A for receiving data related to the formation properties and downhole conditions measured and/or recorded by downhole tool 132A. Telemetry device 134 may transmit the downhole information received from downhole tool 132A to computer 144 located at the surface of the well site. The information may be transmitted using any suitable communication channel (e.g., pressure pulses within the drilling fluid flowing in drill string 108, acoustic telemetry through the pipes of the drill string 108, electromagnetic telemetry, optical fibers embedded in the drill string 108, or any combination thereof). For example, drilling system 100A may employ mud pulse telemetry for transmitting downhole information collected by downhole tool 132A to the surface during the drilling operation. However, it should be appreciated that embodiments are not limited thereto and that any of various other types of data communication techniques may be used for sending the downhole information to the surface. Such techniques may include, for example and without limitation, wireless communication techniques and wireline or any other type of wired electrical communication techniques.

In the above mud pulse telemetry example, telemetry device 134 may encode the downhole information using a data compression scheme and transmit the encoded data to the surface by modulating the flow of drilling fluid through drill string 108 so as to generate pressure pulses that propagate to the surface. The pressure pulses may be received at the surface by various transducers 136, 138 and 140, which convert the received pulses into electrical signals for a signal digitizer 142 (e.g., an analog to digital converter). While three transducers 136, 138 and 140 are shown in FIG. 1A, greater or fewer numbers of transducers may be used as desired for a particular implementation. Digitizer 142 supplies a digital form of the pressure signals to computer 144.

In one or more embodiments, computer 144 may function as a surface control system of drilling rig 104A for monitoring and controlling downhole operations at the well site. Computer 144 may be implemented using any type of computing device having at least one processor and a memory. Computer 144 may process and decode the digital signals received from digitizer 142 using an appropriate decoding scheme. The resulting decoded telemetry data may be further analyzed and processed by computer 144 to display useful information to a well site operator. The processing performed by computer 144 may include performing a DTBB inversion based on one or more selected multi-layer inversion models, as described above. As will be described in further detail below, the results of the DTBB inversion may then be used to make appropriate geosteering decisions, e.g., for adjusting or optimizing a path of wellbore 126 being drilled through the formation.

It should be appreciated that computer 144 may be located at the surface of the well site, e.g., near drilling rig 104A, or at a remote location from the well site. While not shown in FIG. 1A, computer 144 may be communicatively coupled to one or more other computer systems via a communication network, e.g., a local area, medium area, or wide area network, such as the Internet. Such other computer systems may include remote computer systems located away from the well site for remotely monitoring and controlling well site operations via the communication network.

To reduce noise in the downhole data received at the surface, drilling system 100A may include a dampener or desurger 152 to reduce noise. Flow line 118 couples to a drilling fluid chamber 154 in desurger 152. A diaphragm or separation membrane 156 separates the drilling fluid chamber 154 from a gas chamber 158. Desurger 152 may include a gas chamber 158 filled with nitrogen at a predetermined percentage, e.g., approximately 50% to 75% of the operating pressure of the drilling fluid. The diaphragm 156 moves with variations in the drilling fluid pressure, enabling the gas chamber to expand and contract, thereby absorbing some of the pressure fluctuations.

In addition to transmitting information collected downhole to the surface, telemetry device 134 may receive information from the surface over one or more of the above-described communication channels. The information received from the surface may include, for example, signals for controlling the operation of the BHA or individual components thereof. Such control signals may be used, for example, to update operating parameters of the BHA for purposes of adjusting a planned trajectory or path of wellbore 126 through the formation during different stages of the drilling operation. In one or more embodiments, the control signals may be representative of commands input by a well site operator for making adjustments to the path of wellbore 126 or controlling various operational variables of the drilling operation as downhole conditions change over time. Examples of such operational variables may include, but are not limited to, weight on bit, drilling fluid flow through the drill pipe, the drill string rotational speed, and the density and viscosity of the drilling fluid.

In one or more embodiments, computer 144 may provide an interface enabling the well site operator at the surface to receive indications of downhole operating conditions and adjust one or more of controllable parameters of the drilling operation accordingly. The interface may be include a display for presenting relevant information, e.g., values of drilling parameters or operational variables, to the operator during the drilling operation as well as a user input device (e.g., a mouse, keyboard, touch-screen, etc.) for receiving input from the operator. For example, computer 144 may enable an operator to select resistivity analysis options, view collected resistivity data, view resistivity analysis results, and/or to perform other relevant tasks during the downhole operation. As downhole operating conditions may continually change over the course of the operation, the operator may use the interface provided by computer 144 to react to such changes in real time by adjusting selected drilling parameters in order to increase and/or maintain drilling efficiency and thereby, optimize the drilling operation.

Figure 1B:
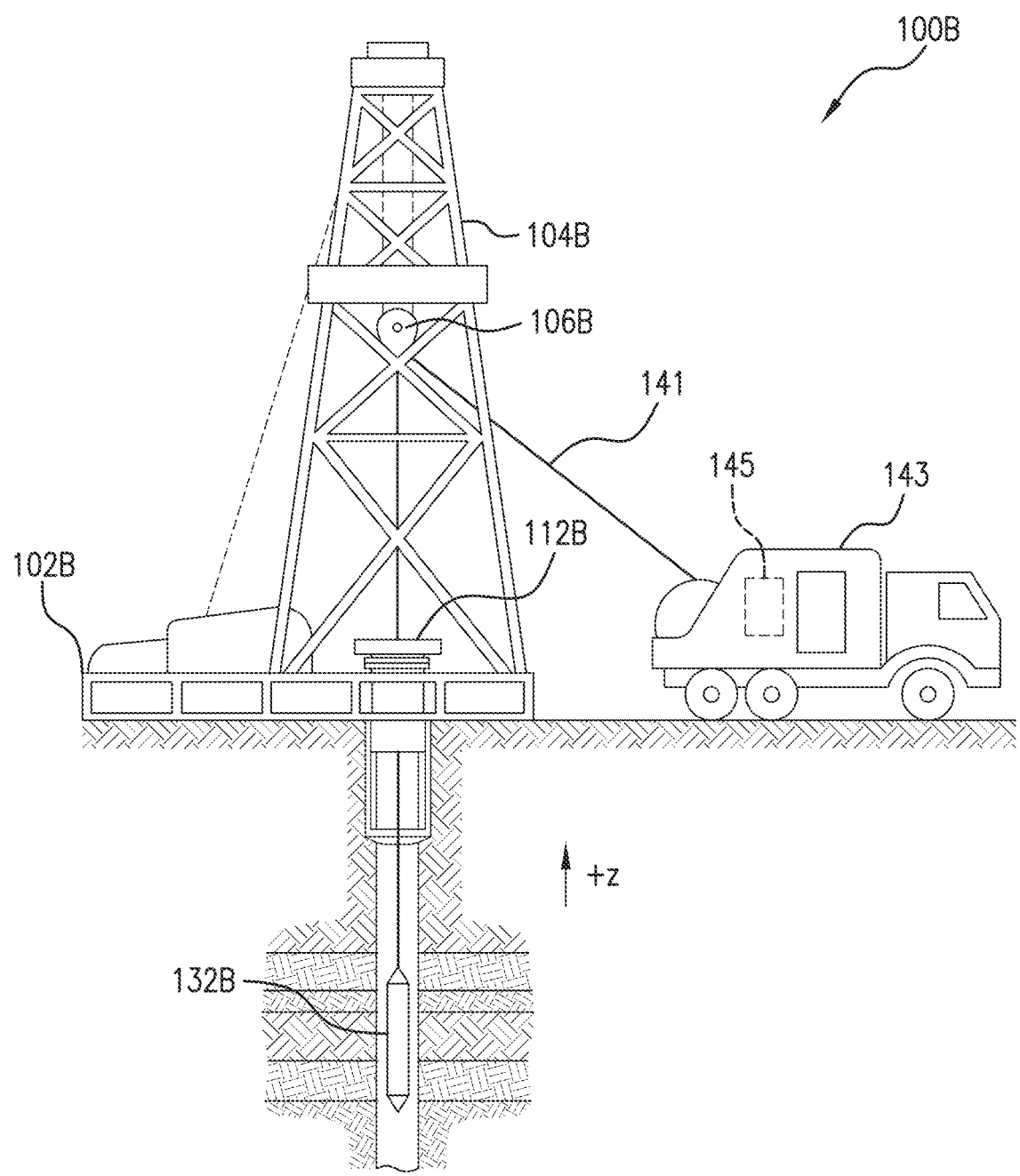
FIG. 1B is a diagram of an illustrative drilling system including a wireline tool for performing a downhole operation at a well site.

FIG. 1B is a diagram of an illustrative drilling system 100B including a downhole tool 132B as an alternative to drilling system 100A including downhole tool 132A of FIG. 1A, as described above, for performing the downhole operation. As shown in FIG. 1B, a drilling platform 102B is equipped with a derrick 104B that supports a hoist 106B. Hoist 106B a cable 141 that is used to lower downhole tool 132B through a wellhead 112B within the wellbore. Downhole tool 132B may be a wireline logging tool for conducting logging operations downhole at various times during the drilling process. For example, a drill string (e.g., drill string 108, as shown in FIG. 1A and described above) may be removed from the wellbore periodically and downhole tool 132B may be inserted for purposes of measuring formation properties in the area surrounding the wellbore at various depths within the formation. Downhole tool 132B in this example may be a logging sonde in the form of an acoustic probe suspended by a cable 141. Cable 141 may have conductors for transporting power to the sonde and telemetry from the sonde to the surface. Downhole tool 132B may have pads and/or centralizing springs to maintain the tool near the axis of the borehole as the tool is pulled uphole. Downhole tool 132B can include a variety of transmitters/receivers for measuring formation resistivity, etc. A logging facility 143 collects resistivity measurements from downhole tool 132B, and includes a computer 145 for processing and storing the resistivity measurements gathered by wireline logging sensors of the logging sonde.

Like computer 144 of FIG. 1A, as described above, computer 145 may be used for monitoring and controlling downhole operations at the well site. Computer 145 may be implemented using any type of computing device having at least one processor and a memory. Also, like computer 144 of FIG. 1A, the processing performed by computer 145 may include performing a DTBB inversion based on one or more selected multi-layer inversion models. The DTBB inversion results may then be used to make appropriate geosteering decisions, e.g., for adjusting or optimizing a path of the wellbore being drilled through the formation. In one or more embodiments, computer 144 and computer 145 of FIGS. 1A and 1B, respectively, may be used to implement a well planning and control system for downhole operations performed at the respective wellsites. An example of such a well planning and control system will be described in further detail below with respect to FIG. 2.

Figure 2:
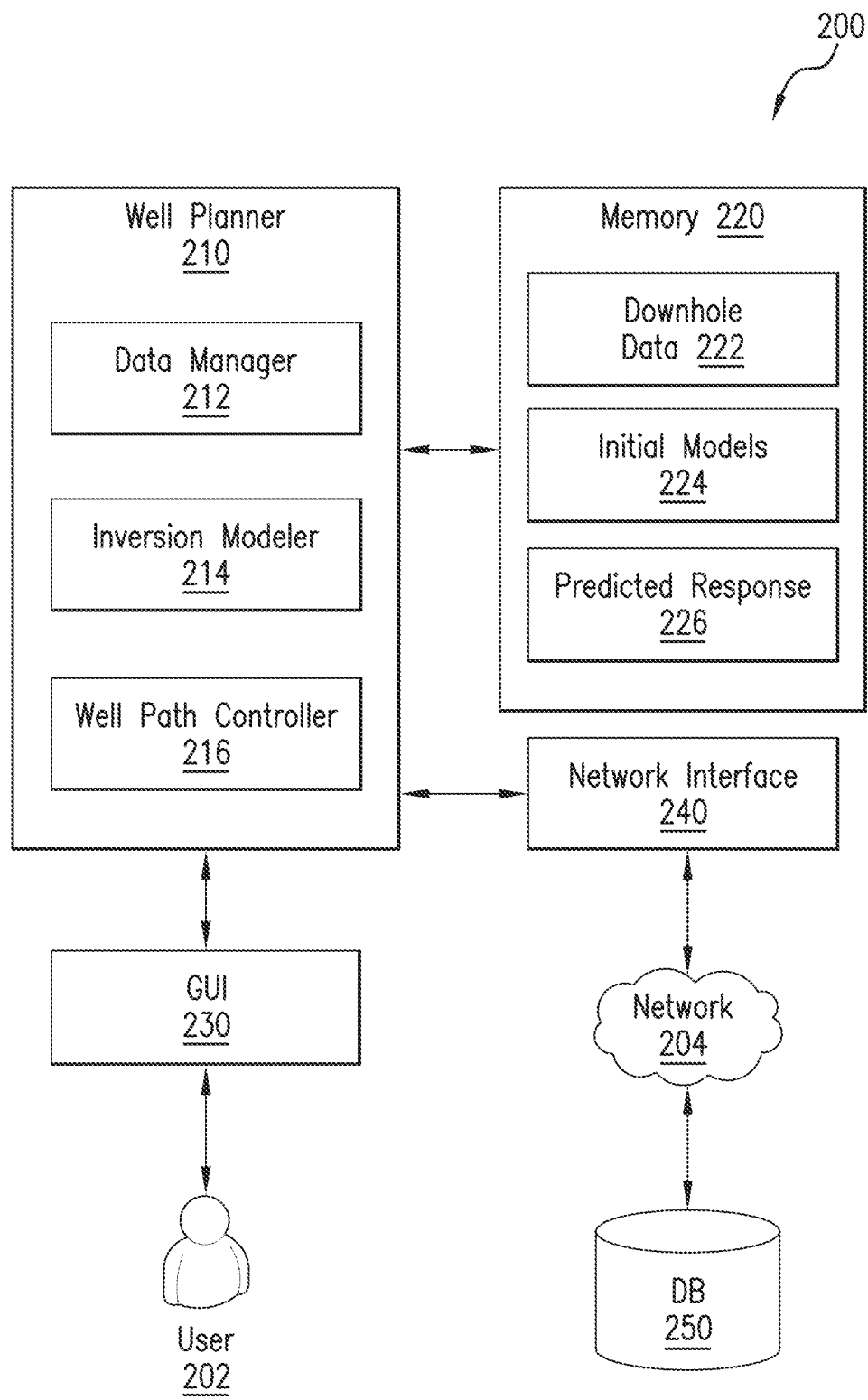
FIG. 2 is a block diagram of an illustrative system for well planning and control during downhole operations at a well site.

FIG. 2 is a block diagram of an illustrative system 200 for well planning and control during downhole operations at a well site. As shown in FIG. 2, system 200 includes a well planner 210, a memory 220, a graphical user interface (GUI) 230, and a network interface 240. In one or more embodiments, well planner 210, memory 220, GUI 230, and network interface 240 may be communicatively coupled to one another via an internal bus of system 200. Although only well planner 210, memory 220, GUI 230, and network interface 240 are shown in FIG. 2, it should be appreciated that system 200 may include additional components, modules, and/or sub-components as desired for a particular implementation.

System 200 can be implemented using any type of computing device having at least one processor and a processor-readable storage medium for storing data and instructions executable by the processor. Examples of such a computing device include, but are not limited to, a mobile phone, a personal digital assistant (PDA), a tablet computer, a laptop computer, a desktop computer, a workstation, a server, a cluster of computers, a set-top box, or other type of computing device. Such a computing device may also include an input/output (I/O) interface for receiving user input or commands via a user input device (not shown). The user input device may be, for example and without limitation, a mouse, a QWERTY or T9 keyboard, a touch-screen, a graphics tablet, or a microphone. The I/O interface also may be used by the computing device to output or present information via an output device (not shown). The output device may be, for example, a display coupled to or integrated with the computing device for displaying a digital representation of the information being presented to the user. The I/O interface in the example shown in FIG. 2 may be coupled to GUI 230 for receiving input from a user 202, e.g., a well operator, and displaying information and content to user 202 based on the received input. GUI 230 can be any type of GUI display coupled to system 200.

As will be described in further detail below, memory 220 can be used to store information accessible by well planner 210 and any of its components for implementing the functionality of the present disclosure. Memory 220 may be any type of recording medium coupled to an integrated circuit that controls access to the recording medium. The recording medium can be, for example and without limitation, a semiconductor memory, a hard disk, or similar type of memory or storage device. In some implementations, memory 220 may be a remote data store, e.g., a cloud-based storage location, communicatively coupled to system 200 over a network 204 via network interface 240. Network 204 can be any type of network or combination of networks used to communicate information between different computing devices. Network 204 can include, but is not limited to, a wired (e.g., Ethernet) or a wireless (e.g., Wi-Fi or mobile telecommunications) network. In addition, network 204 can include, but is not limited to, a local area network, medium area network, and/or wide area network such as the Internet.

In one or more embodiments, well planner 210 includes a data manager 212, an inversion modeler 214, and a well path controller 216. Data manager 212 may be used to obtain information relating to downhole operations being performed at a well site. The downhole operation may be a drilling operation for drilling a wellbore (e.g., wellbore 126 of FIG. 1A, as described above) along a planned path through different layers of a subsurface formation. Such information may include real-time measurements of formation properties collected by a downhole tool (e.g., downhole tool 132A of FIG. 1A, as described above) as the wellbore is drilled along the path. The downhole tool may be coupled to the bottom-hole assembly of a drill string (e.g., drill string 108 of FIG. 1A, as described above) disposed within the wellbore. In some implementations, the downhole tool may be an electromagnetic resistivity LWD tool for measuring the resistivity of the surrounding formation in areas ahead of the tool (look-ahead) and/or surrounding the tool (look-around). The measurements collected by the downhole tool may be stored within memory 220 as downhole data 222.

In one or more embodiments, inversion modeler 214 may predict a response of the downhole tool for a plurality of formation layers along the path of the wellbore, based on each of a plurality of initial models 224 of the formation layers. As described above, each initial model may be a multi-layer formation model generated by randomly sampling different sets of formation parameters such that the generated models cover all possible parameters for the multiple formation layers of interest. Such sampling may be performed using any of various statistical techniques, e.g., based on a predefined range of parameters within some probability distribution.

In one or more embodiments, initial models 224 may be stored within memory 220 after being generated by inversion modeler 214 during the downhole operation, e.g., prior to reaching a logging point along a portion of the path during a current stage of the operation being performed. The predicted response of the downhole tool based on each initial model may also be stored in memory 220 as predicted responses 226. Alternatively, inversion models 224 and/or predicted responses 226 may have been previously generated and stored in a remote database (DB) 250. Accordingly, inversion models 224 and predicted responses 226 in this example may have been retrieved by inversion modeler 214 from DB 250 via network interface 240 and network 204 and then stored within memory 220 for use during the downhole operation. DB 250 may be any remote data storage device or system used to store any of various types of information accessible to inversion modeler 214 and other components of well planner 210 via network 204 for performing the DTBB inversion techniques disclosed herein.

In one or more embodiments, inversion modeler 214 may compare the predicted response from each of initial models 224 with the tool's actual response, based on measurements of formation parameters obtained from the tool (and stored in memory 220 as downhole data 222) during the current stage of the downhole operation. Inversion modeler 214 may then select one or more of initial models 224 as an inversion model, based on the comparison and at least one selection criterion. The selection criterion may be, for example, a misfit threshold used to select only those initial models that produce a predicted response that matches or fits the actual response within a given error tolerance. Thus, any initial models 224 having a misfit at or above a certain misfit threshold may be disqualified and removed from the set of models selected for performing inversion.

In addition to the misfit threshold, other selection criteria may be used to qualify the set of initial models that are selected as inversion models for performing DTBB inversion during the downhole operation. For example, such another selection criterion may be a particular formation parameter of interest, e.g., resistivity or resistivity contrast. The resistivity contrast may represent a gradient transition of formation resistivity between different formation layers. In this example, each of initial models 224 may be used to estimate or predict the resistivity contrast across different formation layers. The predicted resistivity contrast from each model may then be compared with prior information indicating the actual or known resistivity contrast between the formation layers. Such prior information may include, for example, actual resistivity values that were previously acquired for each formation layer by a downhole electromagnetic resistivity LWD tool within a nearby offset well. Resistivity contrast in this example may be used to select as inversion models only those initial models 224 for which the comparison reveals predicted resistivity values that are consistent with (e.g., within a given error tolerance of) the actual or known resistivity values across the different formation layers. It should be appreciated that a similar comparison may be performed for predicted and actual resistivity values corresponding to one or more logging points within the same formation layer. It should also be appreciated that the measurements of actual formation resistivity may be acquired and compared with predicted resistivity values in real-time during the downhole operation along the path of the wellbore. Also, while the above example is described in the context of resistivity contrasts, it should be appreciated that the disclosed techniques may be applied to other relevant formation parameters/properties as desired for a particular implementation.

Resistivity contrast or other formation parameter in the above example may serve as a secondary selection criterion that may be used in conjunction with the misfit threshold to further qualify or refine the set of initial models 224 according to a particular formation parameter of interest and an associated misfit or error tolerance.

Another example of a secondary selection criterion is a quality factor that can be used to assess the quality or accuracy of each initial model with respect to one or more inversion parameters of interest. Examples of such quality factors may include, but are not limited to, model parameter importance, model confidence intervals, and downhole tool sensitivity. Downhole tool sensitivity in particular may be used, for example, to filter out or disqualify any initial models having DTBB definitions that are so far from the tool's current position within the formation that they are beyond the tool's capabilities or sensitivity range. In one or more embodiments, one or more of the above-described selection criteria may be selected or specified by a user 202 via GUI 230.

In one or more embodiments, inversion modeler 214 may use the inversion model(s) selected from initial models 224 to perform inversion for one or more subsequent stages of the downhole operation along the path of the wellbore. The results of the inversion performed using the selected model(s) may be displayed to user 202 of system 200 via GUI 230. In some implementations, a graphical representation of the inversion results may be displayed via GUI 230.

Figure 3:
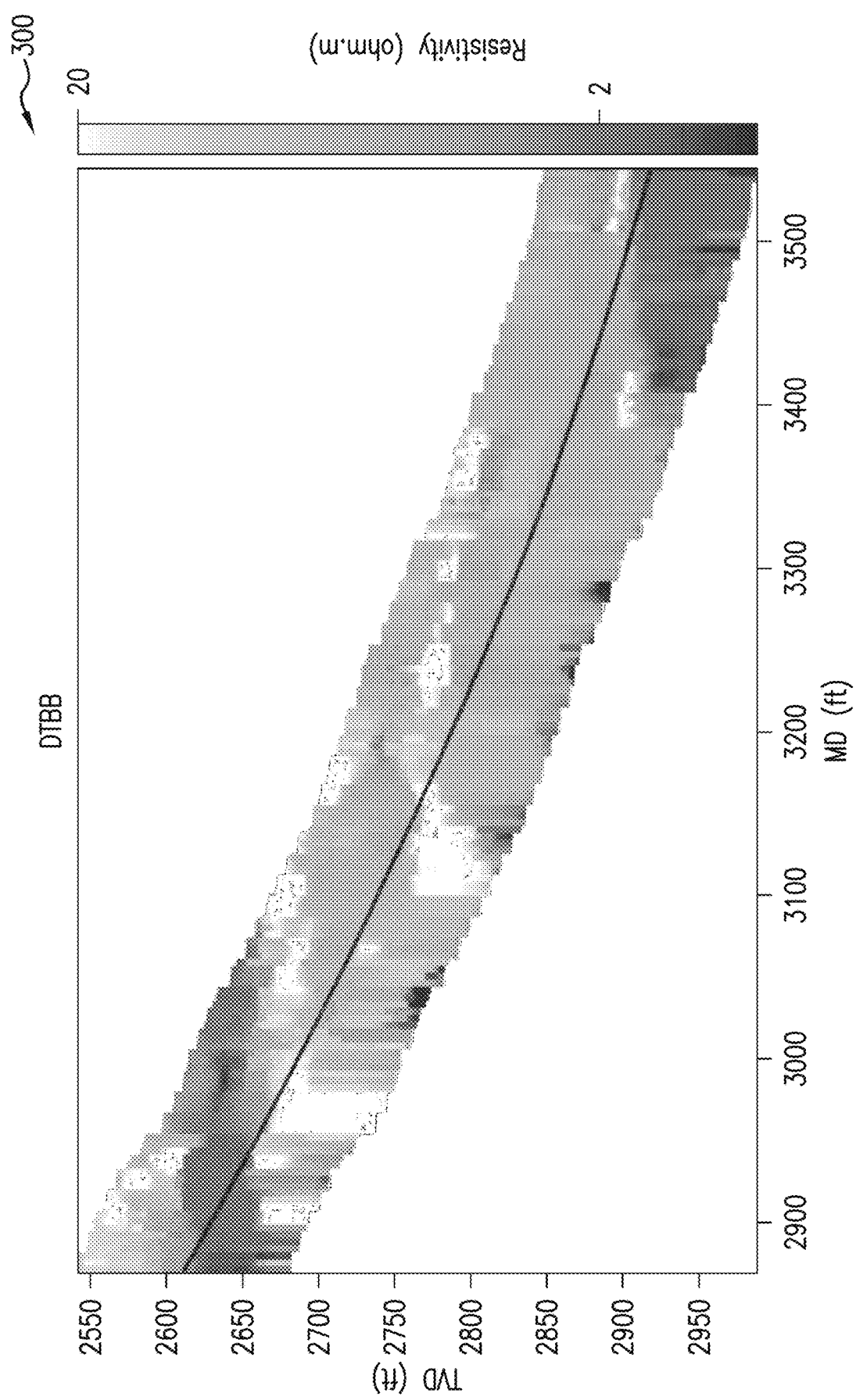
FIG. 3 is a plot graph illustrating the results of a distance to bed boundary (DTBB) inversion for multiple layers of a subsurface formation.

FIG. 3 is a plot graph 300 illustrating an example of such a graphical representation of formation resistivity versus depth resulting from a distance to bed boundary (DTBB) inversion with multiple initial guesses for multiple layers of a subsurface formation. The multiple initial guesses in this example may correspond to initial models 224 of FIG. 2, as described above.

In one or more embodiments, well path controller 216 may use the results of the inversion by inversion modeler 214 to adjust or optimize the path of the wellbore. The one or more subsequent stages of the downhole operation may then be performed along the adjusted or optimized path of the wellbore.

It should be appreciated that well planner 210 and its components (including data manager 212, inversion modeler 214, and well path controller 216) may be implemented in software, firmware, hardware, or any combination thereof. Furthermore, it should be appreciated that embodiments of well planner 210, data manager 212, inversion modeler 214, and well path controller 216, or portions thereof, can be implemented to run on any type of processing device including, but not limited to, a computer, workstation, embedded system, networked device, mobile device, or other type of processor or computer system capable of carrying out the functionality described herein.

Figure 4:
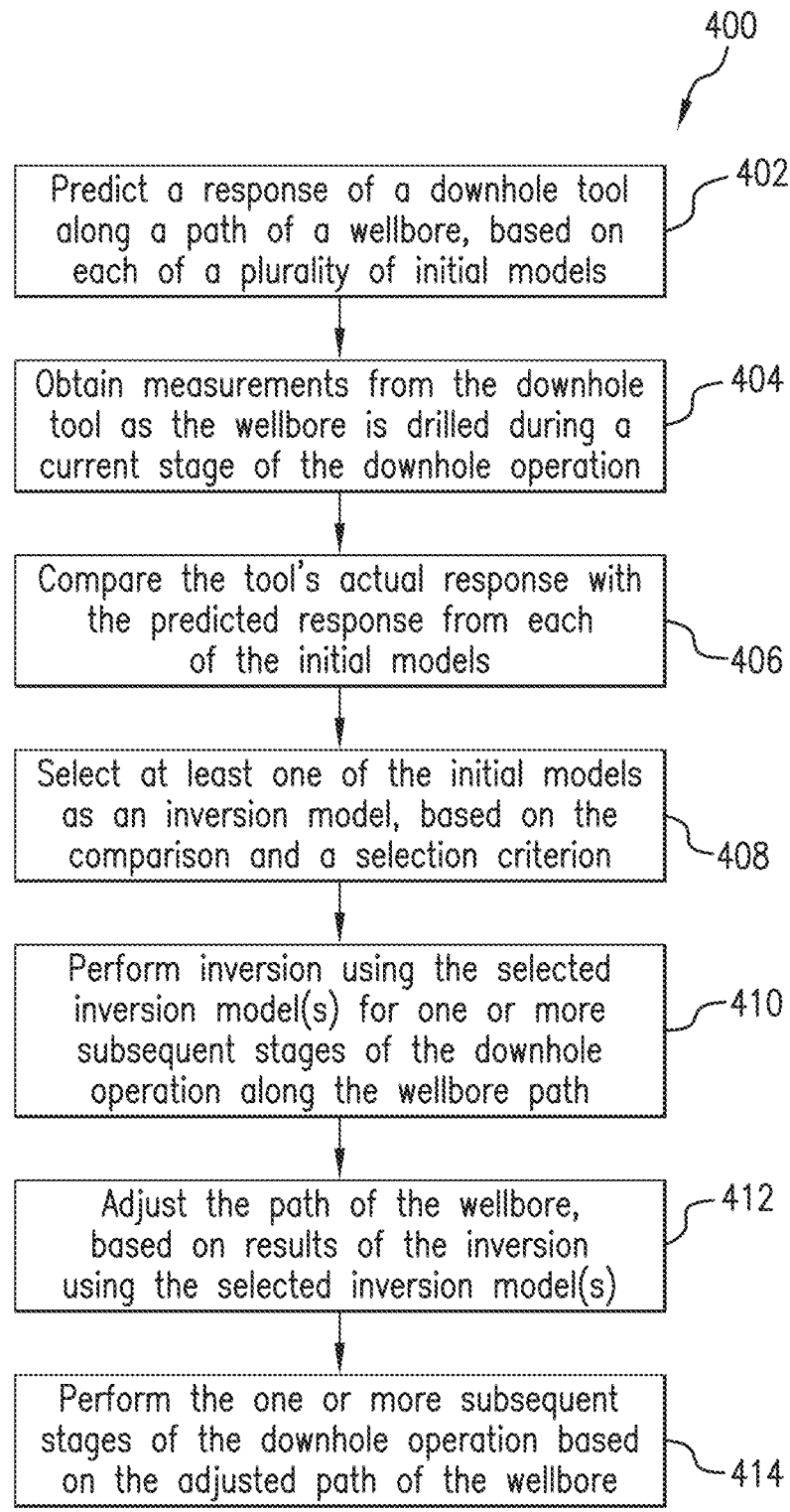
FIG. 4 is a flowchart of an illustrative process for geosteering inversion during downhole operations.

FIG. 4 is a flowchart of an illustrative process 400 for geosteering inversion with multiple initial guesses during downhole operations. For purposes of discussion, process 400 will be described with reference to system 100A of FIG. 1A, as described above. However, process 400 is not intended to be limited thereto. Also, for discussion purposes, process 400 will be described using system 200 of FIG. 2, as described above, but is not intended to be limited thereto. For example, process 400 may be implemented using well planner 210 of FIG. 2, as described above.

As shown in FIG. 4, process begins in block 402, which includes predicting a response of a downhole tool along a path of a wellbore to be drilled through a subsurface formation over different stages of a downhole operation, based on each of a plurality of initial models of the formation. As described above, each of the initial models may represent a different number of formation layers over a specified range from one to any number (N) of layers. Thus, a one-layer model may be a single-layer model representing a homogenous formation, and an N-layer may be multi-layer formation model representing a plurality of formation layers. Each of the initial models may be generated by randomly sampling different sets of formation parameters for multiple formation layers, e.g., based on a predefined range of parameters within some probability distribution. Such sampling may be performed such that the generated models cover all possible formation parameters. Accordingly, the generated inversion models may represent multiple initial guesses of formation properties for multiple layers of the formation.

In one or more embodiments, block 402 includes performing forward modeling to predict the response of the downhole tool for the different number of formation layers represented by each of the plurality of initial models. For example, the response of the downhole tool may be predicted in block 402 for each of the formation layers represented by each of the plurality of initial models over a specified depth range within the subsurface formation.

In block 404, an actual response of the downhole tool with respect to one or more formation parameters is determined, based on measurements obtained from the downhole tool as the wellbore is drilled along the path during a current stage of the downhole operation. As will be described in further detail below, the measurements from the downhole tool may be used to qualify the initial models for performing DTBB inversion for multiple formation layers along the path of the wellbore during the downhole operation.

The qualification of the initial models may begin in block 406, which includes comparing the actual response of the downhole tool with the predicted response from each of the plurality of initial models. The comparison in block 406 may include, for example, determining an amount of deviation between the actual measurements of the formation properties obtained by the downhole tool and the predicted response of the tool for each initial model. For example, a misfit value representing the amount of deviation may be calculated for each initial model based on the comparison between the predicted response and the tool's actual response. The predicted responses in this example may include estimated values for the one or more formation parameters of interest along the path of the wellbore, based on each of the initial models. The one or more formation parameters may be selected from the group consisting of: a resistivity of a current formation layer; a resistivity of each of one or more additional formation layers located ahead of the current formation layer along the path of the wellbore; a distance between the current formation layer and the one or more additional formation layers; a resistivity contrast representing a gradient transition of formation resistivity between the current formation layer and the one or more additional formation layers; and a dip angle of the current formation layer and the one or more additional formation layers. The misfit value therefore may represent the amount of deviation between the predicted values of one or more of these formation parameters from each model and the actual formation parameter values based on the measurements obtained from the downhole tool.

In block 408, at least one of the plurality of initial models is selected as an inversion model, based on the comparison and at least one selection criterion. As described above, the selection criterion may be a misfit threshold, where only those initial models for which the misfit value is below the misfit threshold are selected. The comparison in block 406 above and the selection of the model(s) based on the selection criterion in block 408 may ensure that only qualified models are used for the inversion performed in block 410. In some implementations, the qualification of the initial models for inversion may be performed in parallel, as shown in FIG. 5.

Figure 5:
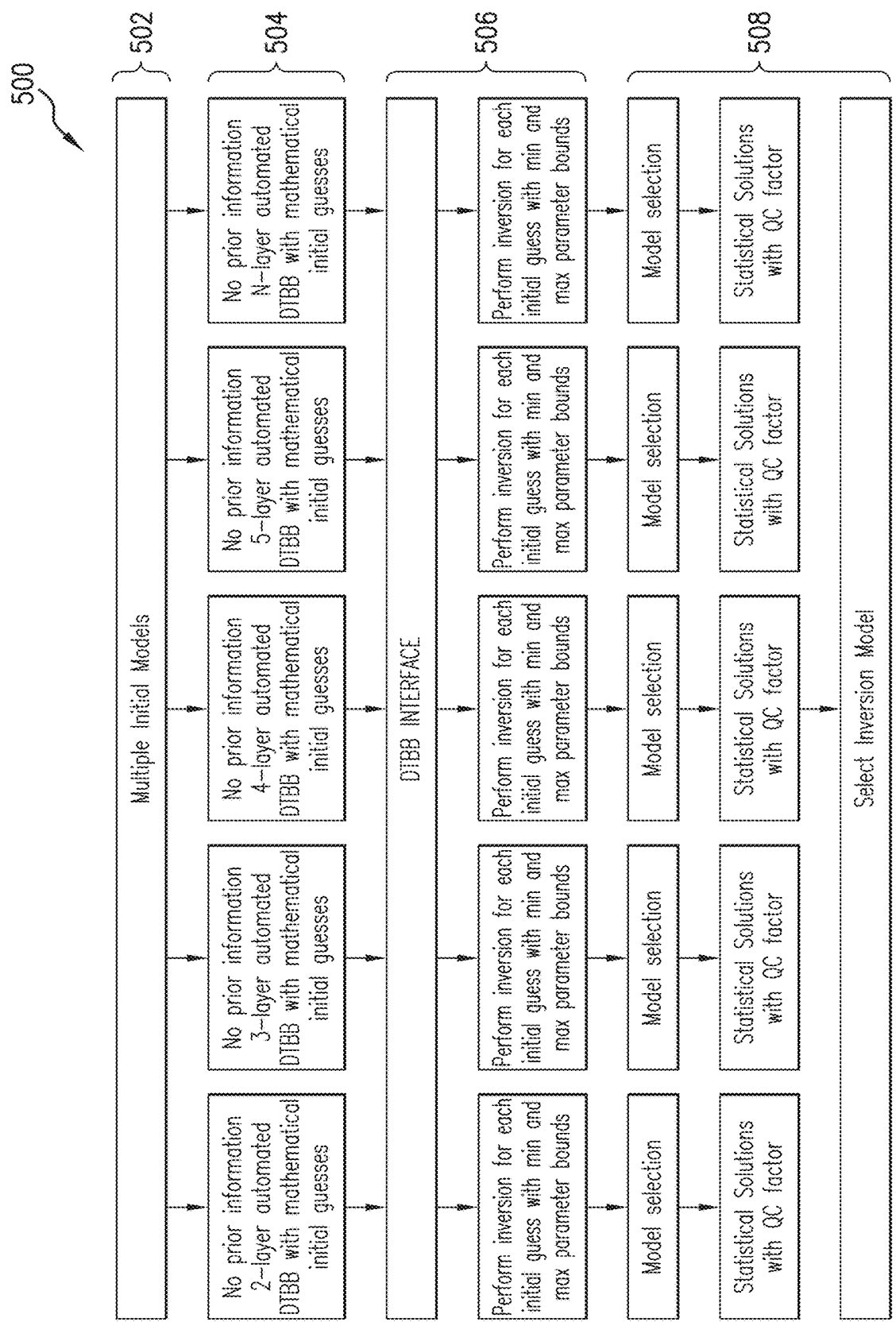
FIG. 5 is a flowchart of an illustrative process for running a plurality of inversion models in parallel for multi-layer DTBB inversion.

FIG. 5 is a flowchart of an illustrative process 500 for running multiple initial models in parallel for multi-layer DTBB inversion. In block 502, a plurality of initial models for the multi-layer DTBB inversion may be generated by randomly sampling different sets of formation parameters, as described above. Alternatively, the initial models may be predefined and retrieved from a database, e.g., DB 250 of FIG. 2, as described above. The formation parameters represented by each initial model may include, but are not limited to, resistivity, position and dip of each of the one or more formation layers represented by that model. As it is often difficult to know the number of layers of the actual formation, each initial model may be defined with a different number of layers over a specified range from 1 to N, e.g., from a 1-layer model representing a single-layer or homogeneous formation to an N-layer model representing an N number of formation layers, where N may be any number (e.g., 20 layers over a specified depth range within the formation). As shown by the example in FIG. 5, a first initial model may be a 2-layer model, a second initial model may be a 3-layer model, and a third initial model may be a 4-layer model and so on. The number of layers may be specified by, for example, a user, such as a well operator (e.g., user 202 of FIG. 2, as described above), during a downhole operation.

In block 504, each model is used to predict a response of a downhole tool for a plurality of formation layers. In some implementations, the predicted responses based on each model may also be predefined and retrieved from the database along with the corresponding model. As the initial models and predicted responses are based on randomly sampled parameters only, no prior information, such as from an offset well, is needed for the inversion workflow. However, it should be appreciated that, in some implementations, prior information, e.g., predetermined parameter bounds, may be incorporated into the inversion workflow. It should also be appreciated that any number of initial models may be used for performing inversion for any number of formation layers.

As described above, the downhole tool may be disposed within a wellbore as it is being drilled along a path through multiple layers of the formation. The predicted responses may include predicted or estimated formation properties or parameters for different formation layers ahead of a current layer of the formation in which the tool is located. The estimated formation properties/parameters may include, for example, a current formation layer resistivity at the tool's current location, a look-ahead resistivity of the formation layer ahead of the current location, and a distance from the current location to the next formation layer ahead. The initial models and predicted responses associated with each model may represent multiple initial guesses for the DTBB inversion in this example.

In block 506, the predicted responses from each model are compared and refined with actual measurements of the formation properties as collected by the downhole tool during the downhole operation along the path of the wellbore through the formation. For example, block 506 may include performing inversion for each initial guess/model with specified minimum and maximum bounds of the formation parameters represented by each model. In block 508, at least one of the models may be selected as an inversion model, based on the comparison and at least one selection criterion, as described above. The selected model(s) in this example may be the most optimal model for performing the multi-layer DTBB inversion along the path of the wellbore.

In some implementations, two or more of the models may be selected and combined to form a single inversion model. The inversion model may be a multi-layer model representing the different formation layers that are represented by each of the selected models. The selected models in this example may be combined using any of various techniques. In one or more embodiments, pixelated versions of the selected models may be generated by replacing the parameter values associated with each model with corresponding pixel values calculated for that model. Each pixel value may represent a value for a pixel in an image of the underlying formation model. Such pixelated models (or the corresponding pixel values for each of the selected initial models) may then be averaged to produce the single inversion model.

Returning to process 400 of FIG. 4, the selected inversion model(s) may be used in block 410 to perform inversion for one or more subsequent stages of the downhole operation along the path of the wellbore. The inversion may be a multi-layer DTBB inversion performed at each logging point of the downhole tool for a specified number of formation layers along the path of the wellbore. The number of Process 400 then proceeds to block 412, which includes adjusting the path of the wellbore for performing the one or more subsequent stages of the downhole operation, based on results of the inversion using the selected inversion model. In block 414, the one or more subsequent stages of the downhole operation may be performed based on the adjusted path of the wellbore through the subsurface formation.

Figure 6:
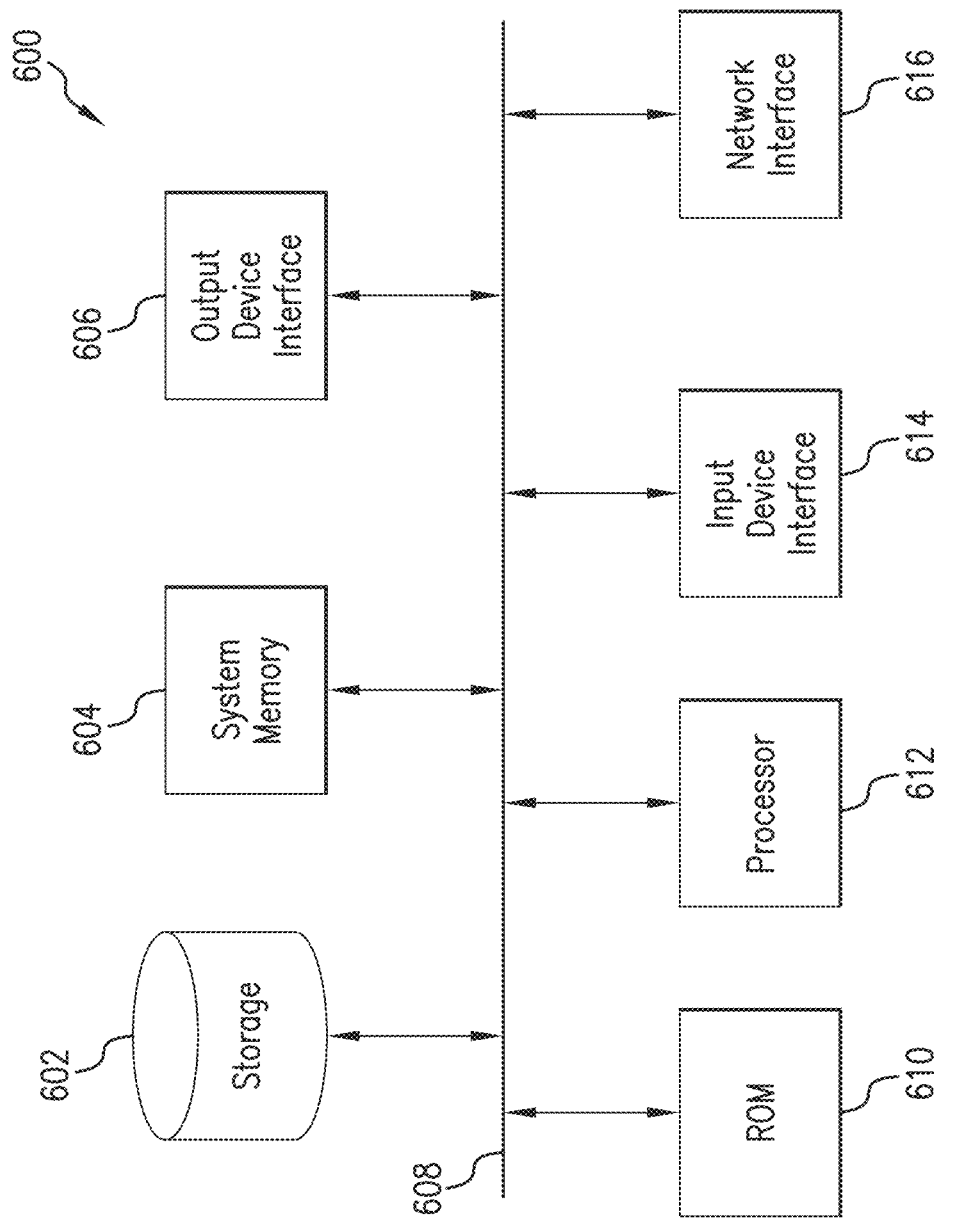
FIG. 6 is a block diagram of an illustrative computer system in which embodiments of the present disclosure may be implemented.

FIG. 6 is a block diagram of an illustrative computer system 600 in which embodiments of the present disclosure may be implemented. For example, processes 400 and 500 of FIGS. 4 and 5, as described above, as well as system 200 of FIG. 2 may be implemented using system 600. System 600 can be a computer, phone, PDA, or any other type of electronic device. Such an electronic device includes various types of computer readable media and interfaces for various other types of computer readable media. As shown in FIG. 6, system 600 includes a permanent storage device 602, a system memory 604, an output device interface 606, a system communications bus 608, a read-only memory (ROM) 610, processing unit(s) 612, an input device interface 614, and a network interface 616.

Bus 608 collectively represents all system, peripheral, and chipset buses that communicatively connect the numerous internal devices of system 600. For instance, bus 608 communicatively connects processing unit(s) 612 with ROM 610, system memory 604, and permanent storage device 602.

From these various memory units, processing unit(s) 612 retrieves instructions to execute and data to process in order to execute the processes of the subject disclosure. The processing unit(s) can be a single processor or a multi-core processor in different implementations.

ROM 610 stores static data and instructions that are needed by processing unit(s) 612 and other modules of system 600. Permanent storage device 602, on the other hand, is a read-and-write memory device. This device is a non-volatile memory unit that stores instructions and data even when system 600 is off. Some implementations of the subject disclosure use a mass-storage device (such as a magnetic or optical disk and its corresponding disk drive) as permanent storage device 602.

Other implementations use a removable storage device (such as a floppy disk, flash drive, and its corresponding disk drive) as permanent storage device 602. Like permanent storage device 602, system memory 604 is a read-and-write memory device. However, unlike storage device 602, system memory 604 is a volatile read-and-write memory, such a random access memory. System memory 604 stores some of the instructions and data that the processor needs at runtime. In some implementations, the processes of the subject disclosure are stored in system memory 604, permanent storage device 602, and/or ROM 610. For example, the various memory units include instructions for computer aided pipe string design based on existing string designs in accordance with some implementations. From these various memory units, processing unit(s) 612 retrieves instructions to execute and data to process in order to execute the processes of some implementations.

Bus 608 also connects to input and output device interfaces 614 and 606. Input device interface 614 enables the user to communicate information and select commands to the system 600. Input devices used with input device interface 614 include, for example, alphanumeric, QWERTY, or T9 keyboards, microphones, and pointing devices (also called "cursor control devices"). Output device interfaces 606 enables, for example, the display of images generated by the system 600. Output devices used with output device interface 606 include, for example, printers and display devices, such as cathode ray tubes (CRT) or liquid crystal displays (LCD). Some implementations include devices such as a touchscreen that functions as both input and output devices. It should be appreciated that embodiments of the present disclosure may be implemented using a computer including any of various types of input and output devices for enabling interaction with a user. Such interaction may include feedback to or from the user in different forms of sensory feedback including, but not limited to, visual feedback, auditory feedback, or tactile feedback. Further, input from the user can be received in any form including, but not limited to, acoustic, speech, or tactile input. Additionally, interaction with the user may include transmitting and receiving different types of information, e.g., in the form of documents, to and from the user via the above-described interfaces.

Also, as shown in FIG. 6, bus 608 also couples system 600 to a public or private network (not shown) or combination of networks through a network interface 616. Such a network may include, for example, a local area network ("LAN"), such as an Intranet, or a wide area network ("WAN"), such as the Internet. Any or all components of system 600 can be used in conjunction with the subject disclosure.

These functions described above can be implemented in digital electronic circuitry, in computer software, firmware or hardware. The techniques can be implemented using one or more computer program products. Programmable processors and computers can be included in or packaged as mobile devices. The processes and logic flows can be performed by one or more programmable processors and by one or more programmable logic circuitry. General and special purpose computing devices and storage devices can be interconnected through communication networks.

Some implementations include electronic components, such as microprocessors, storage and memory that store computer program instructions in a machine-readable or computer-readable medium (alternatively referred to as computer-readable storage media, machine-readable media, or machine-readable storage media). Some examples of such computer-readable media include RAM, ROM, read-only compact discs (CD-ROM), recordable compact discs (CD-R), rewritable compact discs (CD-RW), read-only digital versatile discs (e.g., DVD-ROM, dual-layer DVD-ROM), a variety of recordable/rewritable DVDs (e.g., DVD-RAM, DVD-RW, DVD+RW, etc.), flash memory (e.g., SD cards, mini-SD cards, micro-SD cards, etc.), magnetic and/or solid state hard drives, read-only and recordable Blu-Ray® discs, ultra density optical discs, any other optical or magnetic media, and floppy disks. The computer-readable media can store a computer program that is executable by at least one processing unit and includes sets of instructions for performing various operations. Examples of computer programs or computer code include machine code, such as is produced by a compiler, and files including higher-level code that are executed by a computer, an electronic component, or a microprocessor using an interpreter.

While the above discussion primarily refers to microprocessor or multi-core processors that execute software, some implementations are performed by one or more integrated circuits, such as application specific integrated circuits (ASICs) or field programmable gate arrays (FPGAs). In some implementations, such integrated circuits execute instructions that are stored on the circuit itself. Accordingly, instructions for performing processes 400 and 500 of FIGS. 4 and 5, respectively, as described above, may be implemented using system 600 or any computer system having processing circuitry or a computer program product including instructions stored therein, which, when executed by at least one processor, causes the processor to perform functions relating to these methods.

As used in this specification and any claims of this application, the terms "computer", "server", "processor", and "memory" all refer to electronic or other technological devices. These terms exclude people or groups of people. As used herein, the terms "computer readable medium" and "computer readable media" refer generally to tangible, physical, and non-transitory electronic storage mediums that store information in a form that is readable by a computer.

Embodiments of the subject matter described in this specification can be implemented in a computing system that includes a back end component, e.g., as a data server, or that includes a middleware component, e.g., an application server, or that includes a front end component, e.g., a client computer having a graphical user interface or a Web browser through which a user can interact with an implementation of the subject matter described in this specification, or any combination of one or more such back end, middleware, or front end components. The components of the system can be interconnected by any form or medium of digital data communication, e.g., a communication network. Examples of communication networks include a local area network ("LAN") and a wide area network ("WAN"), an internetwork (e.g., the Internet), and peer-to-peer networks (e.g., ad hoc peer-to-peer networks).

The computing system can include clients and servers. A client and server are generally remote from each other and typically interact through a communication network. The relationship of client and server arises by virtue of computer programs running on the respective computers and having a client-server relationship to each other. In some embodiments, a server transmits data (e.g., a web page) to a client device (e.g., for purposes of displaying data to and receiving user input from a user interacting with the client device). Data generated at the client device (e.g., a result of the user interaction) can be received from the client device at the server.

It is understood that any specific order or hierarchy of steps in the processes disclosed is an illustration of exemplary approaches. Based upon design preferences, it is understood that the specific order or hierarchy of steps in the processes may be rearranged, or that all illustrated steps be performed. Some of the steps may be performed simultaneously. For example, in certain circumstances, multitasking and parallel processing may be advantageous. Moreover, the separation of various system components in the embodiments described above should not be understood as requiring such separation in all embodiments, and it should be understood that the described program components and systems can generally be integrated together in a single software product or packaged into multiple software products.

Furthermore, the exemplary methodologies described herein may be implemented by a system including processing circuitry or a computer program product including instructions which, when executed by at least one processor, causes the processor to perform any of the methodology described herein.

As described above, embodiments of the present disclosure are particularly useful for geosteering inversion. In one embodiment of the present disclosure, a computer-implemented method of geosteering inversion includes: predicting a response of a downhole tool along a path of a wellbore to be drilled through a subsurface formation over different stages of a downhole operation, based on each of a plurality of initial models of the subsurface formation, each of the initial models representing a different number of formation layers over a specified range; determining an actual response of the downhole tool with respect to one or more formation parameters, based on measurements obtained from the downhole tool as the wellbore is drilled along the path during a current stage of the downhole operation; comparing the actual response of the downhole tool with the predicted response from each of the plurality of initial models; selecting at least one of the plurality of initial models as an inversion model, based on the comparison and at least one selection criterion; performing inversion for one or more subsequent stages of the downhole operation along the path of the wellbore, based on the selected inversion model; and adjusting the path of the wellbore for performing the one or more subsequent stages of the downhole operation, based on results of the inversion using the selected inversion model. Similarly, a computer-readable storage medium having instructions stored therein is disclosed. The instructions, when executed by a computer cause the computer to perform a plurality of functions, including functions to: predict a response of a downhole tool along a path of a wellbore to be drilled through a subsurface formation over different stages of a downhole operation, based on each of a plurality of initial models of the subsurface formation, each of the initial models representing a different number of formation layers over a specified range; determine an actual response of the downhole tool with respect to one or more formation parameters, based on measurements obtained from the downhole tool as the wellbore is drilled along the path during a current stage of the downhole operation; compare the actual response of the downhole tool with the predicted response from each of the plurality of initial models; select at least one of the plurality of initial models as an inversion model, based on the comparison and at least one selection criterion; perform inversion for one or more subsequent stages of the downhole operation along the path of the wellbore, based on the selected inversion model; and adjust the path of the wellbore for performing the one or more subsequent stages of the downhole operation, based on results of the inversion using the selected inversion model.

One or more of the foregoing embodiments may further include: randomly sampling different sets of formation parameters based on predefined parameter ranges within a probability distribution associated with the subsurface formation; and generating the plurality of initial models based on the randomly sampled sets of formation parameters. Also, one or more of the foregoing embodiments may include any one of the following elements, alone or in combination with each other: the response of the downhole tool is predicted before the inversion is performed during the current stage of the downhole operation; the response of the downhole tool is predicted for each of the formation layers represented by each of the plurality of initial models over a specified depth range within the subsurface formation; performing forward modeling to predict the response of the downhole tool for the different number of formation layers represented by each of the plurality of initial models; the selection criterion is a misfit threshold; predicting a response includes estimating values for the one or more formation parameters along the path of the wellbore, based on each of the plurality of initial models; comparing includes calculating a misfit value representing an amount of deviation between the measurements obtained by the downhole tool and the estimated values of the one or more formation parameters from each of the plurality of initial models; selecting includes selecting at least one of the plurality of initial models for which the misfit value is below the misfit threshold; the downhole tool is coupled to a bottom hole assembly of a drill string disposed within the wellbore and adjusting includes adjusting one or more operating parameters of the bottom hole assembly for steering the wellbore as it is drilled through the subsurface formation during the one or more second stages of the downhole operation; the downhole tool is an electromagnetic resistivity tool that measures the one or more formation parameters; and the one or more formation parameters are selected from the group consisting of: a resistivity of a current formation layer; a resistivity of each of one or more additional formation layers located ahead of the current formation layer along the path of the wellbore; a distance between the current formation layer and the one or more additional formation layers; a resistivity contrast representing a gradient transition of formation resistivity between the current formation layer and the one or more additional formation layers; and a dip angle of the current formation layer and the one or more additional formation layers.

Furthermore, a system for geosteering inversion has been described. The system includes at least one processor and a memory coupled to the processor having instructions stored therein, which when executed by the processor, cause the processor to perform functions including functions to: predict a response of a downhole tool along a path of a wellbore to be drilled through a subsurface formation over different stages of a downhole operation, based on each of a plurality of initial models of the subsurface formation, each of the initial models representing a different number of formation layers over a specified range; determine an actual response of the downhole tool with respect to one or more formation parameters, based on measurements obtained from the downhole tool as the wellbore is drilled along the path during a current stage of the downhole operation; compare the actual response of the downhole tool with the predicted response from each of the plurality of initial models; select at least one of the plurality of initial models as an inversion model, based on the comparison and at least one selection criterion; perform inversion for one or more subsequent stages of the downhole operation along the path of the wellbore, based on the selected inversion model; and adjust the path of the wellbore for performing the one or more subsequent stages of the downhole operation, based on results of the inversion using the selected inversion model.

In one or more embodiments, the system may further include any of the following functions or elements, alone or in combination with each other: randomly sample different sets of formation parameters based on predefined parameter ranges within a probability distribution associated with the subsurface formation; generate the plurality of initial models based on the randomly sampled sets of formation parameters; the response of the downhole tool is predicted before the inversion is performed during the current stage of the downhole operation; the response of the downhole tool is predicted before the current stage of the downhole operation, and the functions performed by the processor further include functions to obtain the predicted response for each of the initial models from a database via a communication network; the response of the downhole tool is predicted for each of the formation layers represented by each of the plurality of initial models over a specified depth range within the subsurface formation; perform forward modeling to predict the response of the downhole tool for the different number of formation layers represented by each of the plurality of initial models; the selection criterion is a misfit threshold, and the functions performed by the processor further include functions to estimate values for the one or more formation parameters along the path of the wellbore, based on each of the plurality of initial models, calculate a misfit value representing an amount of deviation between the measurements obtained by the downhole tool and the estimated values of the one or more formation parameters from each of the plurality of initial models, and select at least one of the plurality of initial models for which the misfit value is below the misfit threshold; the downhole tool is coupled to a bottom hole assembly of a drill string disposed within the wellbore, and the functions performed by the processor further include functions to adjust one or more operating parameters of the bottom hole assembly for steering the wellbore as it is drilled through the subsurface formation during the one or more second stages of the downhole operation; the downhole tool is an electromagnetic resistivity tool that measures the one or more formation parameters, and the one or more formation parameters are selected from the group consisting of: a resistivity of a current formation layer; a resistivity of each of one or more additional formation layers located ahead of the current formation layer along the path of the wellbore; a distance between the current formation layer and the one or more additional formation layers; a resistivity contrast representing a gradient transition of formation resistivity between the current formation layer and the one or more additional formation layers; and a dip angle of the current formation layer and the one or more additional formation layers.

While specific details about the above embodiments have been described, the above hardware and software descriptions are intended merely as example embodiments and are not intended to limit the structure or implementation of the disclosed embodiments. For instance, although many other internal components of the system 600 are not shown, those of ordinary skill in the art will appreciate that such components and their interconnection are well known.

In addition, certain aspects of the disclosed embodiments, as outlined above, may be embodied in software that is executed using one or more processing units/components. Program aspects of the technology may be thought of as "products" or "articles of manufacture" typically in the form of executable code and/or associated data that is carried on or embodied in a type of machine readable medium. Tangible non-transitory "storage" type media include any or all of the memory or other storage for the computers, processors or the like, or associated modules thereof, such as various semiconductor memories, tape drives, disk drives, optical or magnetic disks, and the like, which may provide storage at any time for the software programming.

Additionally, the flowchart and block diagrams in the figures illustrate the architecture, functionality, and operation of possible implementations of systems, methods and computer program products according to various embodiments of the present disclosure. It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

The above specific example embodiments are not intended to limit the scope of the claims. The example embodiments may be modified by including, excluding, or combining one or more features or functions described in the disclosure.

As used herein, the singular forms "a", "an" and "the" are intended to include the plural forms as well, unless the context clearly indicates otherwise. It will be further understood that the terms "comprise" and/or "comprising," when used in this specification and/or the claims, specify the presence of stated features, integers, steps, operations, elements, and/or components, but do not preclude the presence or addition of one or more other features, integers, steps, operations, elements, components, and/or groups thereof. The corresponding structures, materials, acts, and equivalents of all means or step plus function elements in the claims below are intended to include any structure, material, or act for performing the function in combination with other claimed elements as specifically claimed. The description of the present disclosure has been presented for purposes of illustration and description, but is not intended to be exhaustive or limited to the embodiments in the form disclosed. Many modifications and variations will be apparent to those of ordinary skill in the art without departing from the scope and spirit of the disclosure. The illustrative embodiments described herein are provided to explain the principles of the disclosure and the practical application thereof, and to enable others of ordinary skill in the art to understand that the disclosed embodiments may be modified as desired for a particular implementation or use. The scope of the claims is intended to broadly cover the disclosed embodiments and any such modification.

What is claimed is:

1. A computer-implemented method of geosteering inversion, the method comprising:
   predicting a response of a downhole tool along a path of a wellbore to be drilled through a subsurface formation over different stages of a downhole operation, based on each of a plurality of initial models of the subsurface formation, each of the initial models representing a different number of formation layers than the other initial models over a specified depth range within the subsurface formation;
   determining an actual response of the downhole tool with respect to one or more formation parameters, based on measurements obtained from the downhole tool as the wellbore is drilled along the path during a current stage of the downhole operation;
   comparing the actual response of the downhole tool with the predicted response from each of the plurality of initial models;
   selecting at least one of the plurality of initial models as an inversion model, based on the comparison and at least one selection criterion;
   performing inversion for one or more subsequent stages of the downhole operation along the path of the wellbore, based on the selected inversion model; and
   adjusting the path of the wellbore for performing the one or more subsequent stages of the downhole operation, based on results of the inversion using the selected inversion model.

2. The method of claim 1, further comprising:
   randomly sampling different sets of formation parameters based on predefined parameter ranges within a probability distribution associated with the subsurface formation; and
   generating the plurality of initial models based on the randomly sampled sets of formation parameters.

3. The method of claim 2, wherein the generating of the plurality of initial models and the predicting of the response based on the initial models are performed during the current stage of the downhole operation and prior to performing the inversion.

4. The method of claim 2, wherein the generating of the plurality of initial models and the predicting of the response based on the initial models are performed prior to the current stage of the downhole operation, and the method further comprises:
   obtaining the predicted response for each of the plurality of initial models from a database via a communication network.

5. The method of claim 1, wherein the response of the downhole tool is predicted for each of the formation layers represented by each of the plurality of initial models over a specified depth range within the subsurface formation.

6. The method of claim 1, wherein predicting the response of the downhole tool comprises: performing forward modeling to predict the response of the downhole tool for the different number of formation layers represented by each of the plurality of initial models.

7. The method of claim 1,
   wherein predicting comprises:
      estimating values for the one or more formation parameters along the path of the wellbore, based on each of the plurality of initial models,
   wherein comparing comprises:
      calculating a misfit value representing an amount of deviation between the measurements obtained by the downhole tool and the estimated values of the one or more formation parameters from each of the plurality of initial models,
   wherein the selection criterion is a misfit threshold, and wherein selecting comprises:
      selecting at least one of the plurality of initial models for which the misfit value is below the misfit threshold.

8. The method of claim 1, wherein the downhole tool is coupled to a bottom hole assembly of a drill string disposed within the wellbore, and adjusting the path of the wellbore comprises:
   adjusting one or more operating parameters of the bottom hole assembly for steering the wellbore as it is drilled through the subsurface formation during the one or more second stages of the downhole operation.

9. The method of claim 1, wherein the downhole tool is an electromagnetic resistivity tool that measures the one or more formation parameters, and the one or more formation parameters are selected from the group consisting of: a resistivity of a current formation layer; a resistivity of each of one or more additional formation layers located ahead of the current formation layer along the path of the wellbore; a distance between the current formation layer and the one or more additional formation layers; a resistivity contrast representing a gradient transition of formation resistivity between the current formation layer and the one or more additional formation layers; and a dip angle of the current formation layer and the one or more additional formation layers.

10. A system for geosteering inversion, the system comprising:
at least one processor; and
a memory coupled to the processor having instructions stored therein, which when executed by the processor, cause the processor to perform functions including functions to:
predict a response of a downhole tool along a path of a wellbore to be drilled through a subsurface formation over different stages of a downhole operation, based on each of a plurality of initial models of the subsurface formation, each of the initial models representing a different number of formation layers than the other initial models over a specified depth range within the subsurface formation;
determine an actual response of the downhole tool with respect to one or more formation parameters, based on measurements obtained from the downhole tool as the wellbore is drilled along the path during a current stage of the downhole operation;
compare the actual response of the downhole tool with the predicted response from each of the plurality of initial models;
select at least one of the plurality of initial models as an inversion model, based on the comparison and at least one selection criterion;
perform inversion for one or more subsequent stages of the downhole operation along the path of the wellbore, based on the selected inversion model; and
adjust the path of the wellbore for performing the one or more subsequent stages of the downhole operation, based on results of the inversion using the selected inversion model.

11. The system of claim 10, wherein the functions performed by the processor further include functions to:
randomly sample different sets of formation parameters based on predefined parameter ranges within a probability distribution associated with the subsurface formation; and
generate the plurality of initial models based on the randomly sampled sets of formation parameters.

12. The system of claim 10, wherein the response of the downhole tool is predicted before the inversion is performed during the current stage of the downhole operation.

13. The system of claim 10, wherein the response of the downhole tool is predicted before the current stage of the downhole operation, and the functions performed by the processor further include functions to:
obtain the predicted response for each of the initial models from a database via a communication network.

14. The system of claim 10, wherein the response of the downhole tool is predicted for each of the formation layers represented by each of the plurality of initial models over a specified depth range within the subsurface formation.

15. The system of claim 10, wherein the functions performed by the processor further include functions to: perform forward modeling to predict the response of the downhole tool for the different number of formation layers represented by each of the plurality of initial models.

16. The system of claim 10, wherein the selection criterion is a misfit threshold, and the functions performed by the processor further include functions to:
estimate values for the one or more formation parameters along the path of the wellbore, based on each of the plurality of initial models;
calculate a misfit value representing an amount of deviation between the measurements obtained by the downhole tool and the estimated values of the one or more formation parameters from each of the plurality of initial models; and
select at least one of the plurality of initial models for which the misfit value is below the misfit threshold.

17. The system of claim 10, wherein the downhole tool is coupled to a bottom hole assembly of a drill string disposed within the wellbore, and the functions performed by the processor further include functions to:
adjust one or more operating parameters of the bottom hole assembly for steering the wellbore as it is drilled through the subsurface formation during the one or more second stages of the downhole operation.

18. The system of claim 10, wherein the downhole tool is an electromagnetic resistivity tool that measures the one or more formation parameters, and the one or more formation parameters are selected from the group consisting of: a resistivity of a current formation layer; a resistivity of each of one or more additional formation layers located ahead of the current formation layer along the path of the wellbore; a distance between the current formation layer and the one or more additional formation layers; a resistivity contrast representing a gradient transition of formation resistivity between the current formation layer and the one or more additional formation layers; and a dip angle of the current formation layer and the one or more additional formation layers.

19. A computer-readable storage medium having instructions stored therein, which when executed by a computer cause the computer to perform a plurality of functions, including functions to:
predict a response of a downhole tool along a path of a wellbore to be drilled through a subsurface formation over different stages of a downhole operation, based on each of a plurality of initial models of the subsurface formation, each of the initial models representing a different number of formation layers than the other initial models over a specified depth range within the subsurface formation;
determine an actual response of the downhole tool with respect to one or more formation parameters, based on measurements obtained from the downhole tool as the wellbore is drilled along the path during a current stage of the downhole operation;
compare the actual response of the downhole tool with the predicted response from each of the plurality of initial models;
select at least one of the plurality of initial models as an inversion model, based on the comparison and at least one selection criterion;
perform inversion for one or more subsequent stages of the downhole operation along the path of the wellbore, based on the selected inversion model; and
adjust the path of the wellbore for performing the one or more subsequent stages of the downhole operation, based on results of the inversion using the selected inversion model.

20. The computer-readable storage medium of claim 19, wherein the selection criterion is a misfit threshold, and the functions performed by the computer further include functions to:
  estimate values for the one or more formation parameters along the path of the wellbore, based on each of the plurality of initial models;
  calculate a misfit value representing an amount of deviation between the measurements obtained by the downhole tool and the estimated values of the one or more formation parameters from each of the plurality of initial models; and
  select at least one of the plurality of initial models for which the misfit value is below the misfit threshold.

* * * * *